United States Patent [19]
Takahashi

[11] Patent Number: 6,009,449
[45] Date of Patent: Dec. 28, 1999

[54] PHASE ANGLE DATA-TRIGONOMETRIC FUNCTION VALUE CONVERTER CIRCUIT AND COMPOSITE DIVERSITY RECEIVER

[75] Inventor: Hideaki Takahashi, Tokyo, Japan

[73] Assignee: NEC Corporation, Tokyo, Japan

[21] Appl. No.: 08/895,262

[22] Filed: Jul. 16, 1997

[30] Foreign Application Priority Data

Jul. 16, 1996 [JP] Japan ................................. 8-186080

[51] Int. Cl.$^6$ ......................................................... G06F 7/38
[52] U.S. Cl. ........................................................... 708/440
[58] Field of Search ................................... 364/729, 721; 341/117; 332/144

[56] References Cited

U.S. PATENT DOCUMENTS

| 4,827,442 | 5/1989 | Mehrgardt et al. ........................ 364/721 |
| 5,249,204 | 9/1993 | Funderburk et al. ...................... 375/97 |
| 5,276,633 | 1/1994 | Fox et al. .................................. 364/721 |
| 5,774,082 | 6/1998 | Chu et al. .................................. 364/721 |
| 5,831,488 | 11/1998 | Nakajima et al. ........................ 364/729 |

FOREIGN PATENT DOCUMENTS

| 47-8460 | 5/1972 | Japan . |
| 51-26021 | 8/1976 | Japan . |
| 53-54436 | 5/1978 | Japan . |
| 4-286246 | 10/1992 | Japan . |
| 5-7172 | 1/1993 | Japan . |
| 7-74734 | 3/1995 | Japan . |
| 7-202970 | 8/1995 | Japan . |
| 7-307724 | 11/1995 | Japan . |

*Primary Examiner*—Tan V. Mai
*Attorney, Agent, or Firm*—Foley & Lardner

[57] ABSTRACT

Disclosed is a phase angle data-trigonometric function value converter circuit for computing a trigonometric function value corresponding to an angle that an angle of 360 degrees is divided into n equal parts, where n is an integer, which has: means for converting the integer n into angle data represented by binary system; a sine value data memory which stores sine values corresponding to the angle data from zero degree to 90 degrees and outputs sine values corresponding to the angle data to be input thereto; a cosine value data memory which stores cosine values corresponding to the angle data from zero degree to 90 degrees and outputs cosine values corresponding to the angle data to be input thereto; a selector to which the sine values output from the sine value data memory and the cosine values output from the cosine value memory are input and which selects the sine values or the cosine values according to the angle data and outputs them; and means for adding a polarity sign to the sine values or cosine values output from the selector according to the angle data.

4 Claims, 4 Drawing Sheets

FIG.3

| b3 b2 b1 b0 | ANGLE | SIGN | SINE VALUE | SIGN | COSINE VALUE |
|---|---|---|---|---|---|
| 0 0 0 0 | 0 | + | 0 | + | 1 |
| 0 0 0 1 | $\frac{\pi}{8}$ | + | 0.382683 | + | 0.923879 |
| 0 0 1 0 | $\frac{\pi}{4}$ | + | 0.707106 | + | 0.707106 |
| 0 0 1 1 | $\frac{3\pi}{8}$ | + | 0.923879 | + | 0.382683 |
| 0 1 0 0 | $\frac{\pi}{2}$ | + | 1 | − | 0 |
| 0 1 0 1 | $\frac{5\pi}{8}$ | + | 0.923879 | − | 0.382683 |
| 0 1 1 0 | $\frac{2\pi}{3}$ | + | 0.707106 | − | 0.707106 |
| 0 1 1 1 | $\frac{7\pi}{8}$ | + | 0.382683 | − | 0.923879 |
| 1 0 0 0 | $\pi$ | − | 0 | − | 1 |
| 1 0 0 1 | $1\frac{\pi}{8}$ | − | 0.382683 | − | 0.923879 |
| 1 0 1 0 | $1\frac{\pi}{4}$ | − | 0.707106 | − | 0.707106 |
| 1 0 1 1 | $1\frac{3}{8}\pi$ | − | 0.923879 | − | 0.382683 |
| 1 1 0 0 | $1\frac{\pi}{2}$ | − | 1 | + | 0 |
| 1 1 0 1 | $1\frac{5}{8}\pi$ | − | 0.923879 | + | 0.382683 |
| 1 1 1 0 | $1\frac{2}{3}\pi$ | − | 0.707106 | + | 0.707106 |
| 1 1 1 1 | $1\frac{7}{8}\pi$ | − | 0.382683 | + | 0.923879 |

FIG.4

| MSB | MSB-1 | SINE VALUE | | COSINE VALUE | | REMARKS |
|---|---|---|---|---|---|---|
| | | SIGN | TABLE | SIGN | TABLE | |
| 0 | 0 | + | SINE | + | COSINE | 1st QUADRANT |
| 0 | 1 | + | COSINE | − | SINE | 2nd QUADRANT |
| 1 | 0 | − | SINE | − | COSINE | 3rd QUADRANT |
| 1 | 1 | − | COSINE | + | SINE | 4th QUADRANT |

PHASE ANGLE DATA-TRIGONOMETRIC FUNCTION VALUE CONVERTER CIRCUIT AND COMPOSITE DIVERSITY RECEIVER

FIELD OF THE INVENTION

This invention relates to a computing circuit for computing a trigonometric-function value from an angle datum to be input, and more particularly to, a phase angle data-trigonometric function value converter circuit for converting phase difference data into trigonometric-function values which are used in a radio communication device which employs a composite diversity reception system in which radio-wave signals modulated by quadrature phase shift keying(QPSK) are received by a plurality of antennas and composed. Also, this invention relates to a composite diversity receiver which employs such a phase angle data-trigonometric function value converter circuit.

BACKGROUND OF THE INVENTION

In conventional radio communication devices which employ a composite diversity reception system that radio-wave signals modulated by a quadrature phase shift keying (QPSK) manner are received by a plurality of antennas and composed, means for converting phase difference angle data into trigonometric function values is used to compute the phase difference data of received radio wave by converting from a polar coordinates system to a rectangular coordinates system.

Conventionally, to compute a trigonometric function value from angle data, a method of computing the trigonometric function value by CPU is used for unpredictable inputs. On the other hand, typically used for predictable inputs is a conversion manner that calculation results are registered in a ROM table etc. and a calculation result written therein is accessed and output according to an input address related to an angle data.

FIG.1 shows an example of such a conversion manner, where sine values are stored corresponding to angles in a sine-wave table and cosine values are stored corresponding to angles in a cosine-wave table. When an angle data is input, a sine value and a cosine value are output corresponding to an address related to the angle data.

Japanese patent application laid-open No.7-307724(1995) discloses a diversity device which employs a like conversion manner that, when composite diversity is conducted, a trigonometric function value is calculated from a value previously stored in ROM after a phase difference of input wave is calculated.

However, it is not desirable that the method of computing the trigonometric function value by CPU is used for predictable inputs, since the manufacturing cost of the device is increased and the scale of the circuit is enlarged. On the other hand, the conversion manner with a storage medium like ROM is suitable for providing a low-cost device and a smaller circuit. However, a large storage medium is required when the angle data to be input is fractionized to improve the precision. For example, when it is fractionized to one degree, a storage capacity of 360 words is necessary.

SUMMARY OF THE INVENTION

Accordingly, it is an object of the invention to provide a phase angle data-trigonometric function value converter circuit which can be produced at a lower manufacturing cost and with a small-scale circuit composition.

It is a further object of the invention to provide a composite diversity receiver which can be produced at a lower manufacturing cost and with a small-scale circuit composition.

According to the invention, a phase angle data-trigonometric function value converter circuit for computing a trigonometric function value corresponding to an angle, where an angle of 360 degrees is divided into n equal parts, n being an integer, and where angle data represented by a binary number correspond to a respective one of the n equal parts of the angle 360 degrees, comprises:

a sine value data memory which stores sine values corresponding to the angle data from zero degree to 90 degrees and outputs sine values corresponding to the angle data to be input thereto;

a cosine value data memory which stores cosine values corresponding to the angle data from zero degree to 90 degrees and outputs cosine values corresponding to the angle data to be input thereto;

a selector to which the sine values output from the sine value data memory and the cosine values output from the cosine value memory are input and which selects the sine values or the cosine values according to the angle data and outputs them; and means for adding a polarity sign to the sine values or cosine values output from the selector according to the angle data.

According to another aspect of the invention, a phase angle data-trigonometric function value converter circuit for computing a trigonometric function value corresponding to an angle, where an angle of 360 degrees is divided into n equal parts, n being an integer, and where angle data represented by a binary number correspond to a respective one of the n equal parts of the angle of 360 degrees, comprises:

a sine value data memory which stores sine values corresponding to the angle data from zero degree to 90 degrees and outputs sine values corresponding to low-order bits which are input as a remainder other than high-order two bits of the angle data to the sine value data memory;

a cosine value data memory which stores cosine values corresponding to the angle data from zero degree to 90 degrees and outputs cosine values corresponding to low-order bits which are input as a remainder other than high-order two bits of the angle data to the cosine value data memory;

a selector to which the sine values output from the sine value data memory and the cosine values output from the cosine value memory are input and which selects the sine values or the cosine values according to a second bit from a most significant bit of the angle data and outputs them;

a quadrant judgement means which outputs quadrant information according to the high-order two bits of the angle data which is input thereto; and means for adding a polarity sign to the sine values output from the selector according to the most significant bit or adding a polarity sign to the cosine values output from the selector according to the quadrant information output from the quadrant judgement means.

BRIEF DESCRIPTION OF THE DRAWINGS

The invention will be explained in more detail in conjunction with the appended drawings, wherein:

FIG.3 is a table for explaining relationships among angle data divided into 16 equal parts, sine values and cosine values, and FIG.4 is a table for explaining relationships between sine values and cosine values in case of angle data divided into n equal parts.

DESCRIPTION OF THE PREFERRED EMBODIMENTS

A phase angle data-trigonometric function value converter circuit in the preferred embodiment of the invention will be explained in FIG.2.

Figure 1:
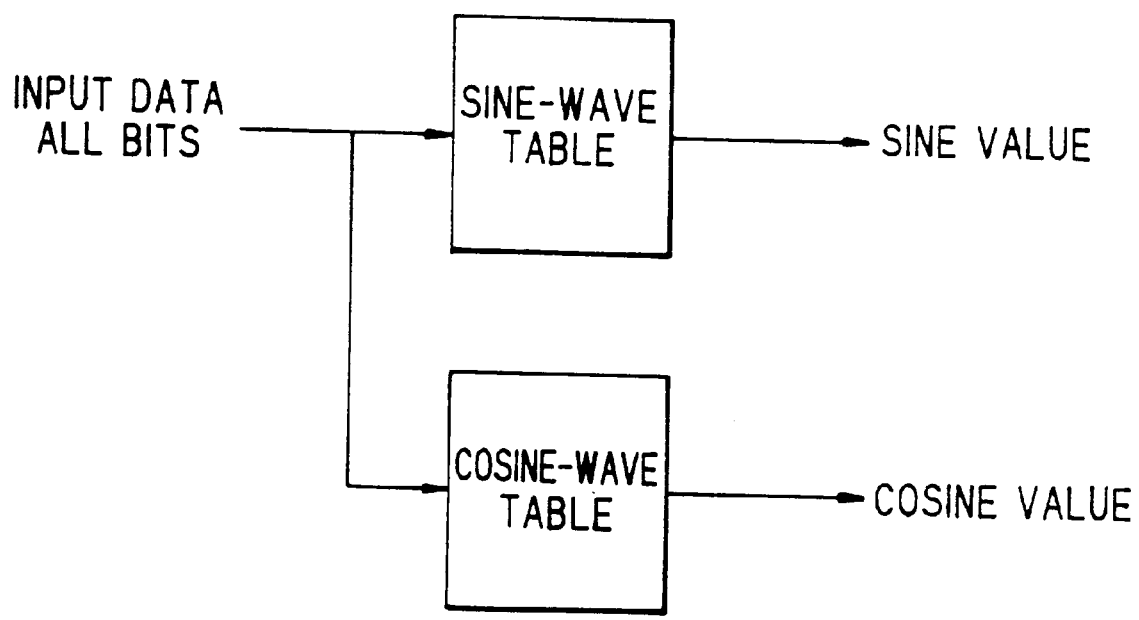
FIG.1 is a block diagram showing the conventional conversion-table system.
Figure 2:
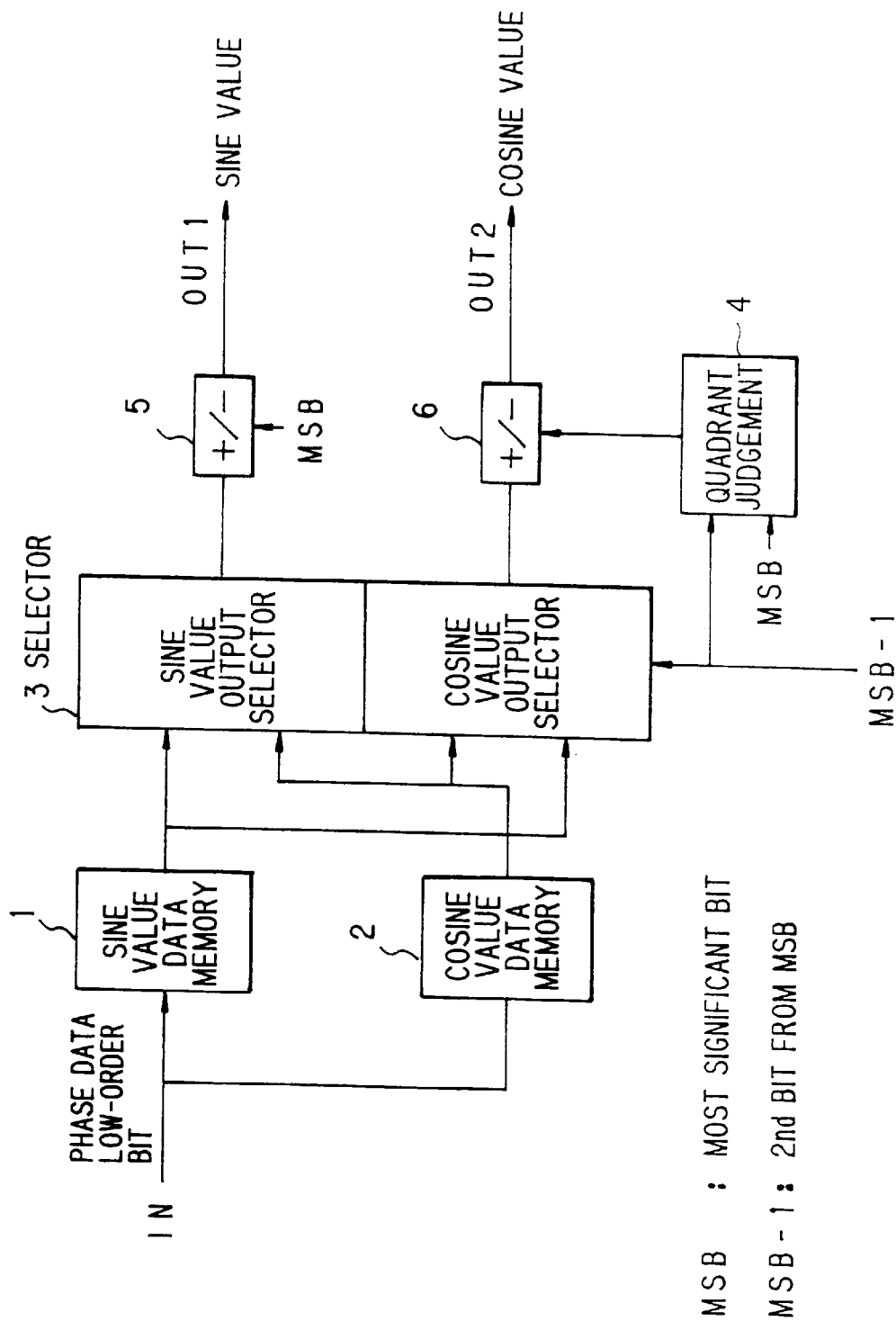
FIG.2 is a block diagram showing a phase angle data-trigonometric function value converter circuit in a preferred embodiment according to the invention.

In FIG.2, 'IN' is an input terminal for receiving low-order bits of phase angle data, 1 is a sine value data memory, 2 is a cosine value data memory 3 is a selector, 4 is a quadrant judgement circuit, 5 is a sign-adding circuit(sine), and 6 is a sign-adding circuit(cosine). The quadrant judgement circuit 4 and the sign-adding circuit(sine) 5 are individually provided with a terminal where the MSB(most significant bit) of phase angle data is input. The selector 3 and the quadrant judgement circuit 4 are individually provided with a terminal where the MSB-1(second bit from MSB) of phase angle data is input. The sign-adding circuit(cosine) 6 is provided with a terminal where an output of the quadrant judgement circuit 4 is input. Sine value data and cosine value data are output from 'OUT1' and 'OUT2', respectively.

This invention is based on that an angle of 360 degrees ($2\pi$) is divided into n equal parts and an angle data is represented by a bit pattern where n is represented by a binary system. For example, a case of dividing into 16 equal parts will be explained below.

Angle data divided into 16 equal parts are represented by 4-bit binary numbers of '0000' to '1111'. The angle data represents an angle of $2n\pi/16$, where n=0 to 15. For example, when an angle data is '0100(=4)', the corresponding angle is $2 \times 4 \times \pi/16 = \pi/2$.

FIG.3 shows the angle data divided into 16 equal parts and the corresponding sine values and cosine values. Now, if the sine values and cosine values corresponding to the angle data with angles of 0° or more and less than 90°($\pi/2$) are named a sine value table and a cosine value table, respectively, the following characteristics are found in FIG.3.

The first characteristic is that, paying attention to the repetition of low-order two bits of the angle data, if signs are neglected, the absolute values of the sine values are equal to the sine value table at angles from 0° to 90°($\pi/2$), the cosine value table at angles from 90° to 180° ($\pi$), the sine value table at angles from 180° to 270° ($3\pi/2$) and the cosine value table at angles from 270° to 360°. Similarly, it is proved that the absolute values of the cosine values are equal to the cosine value table at angles from 0° to 90° ($\pi/2$), the sine value table at angles from 90° to 180° ($\pi$), the cosine value table at angles from 180° to 270° ($3\pi/2$) and the sine value table at angles from 270° to 360°.

The second characteristic is that, paying attention to the high-order two bits(MSB and MSB-1(second bit from MSB)) of the angle data, '00' corresponds to the first quadrant, '01' to the second quadrant, '10' to the third quadrant and '11' to the fourth quadrant.

The two characteristics are maintained even when the number of divided equal parts(the number of bits) is increased. Namely, even when the number of divided equal parts(the number of bits as to angle data) is increased, the high-order two bits always give a certain quadrant and, with the variation in the low-order two bits, the absolute value of the sine value are alternately equal to the sine value table, cosine value table, sine value table and cosine value table at intervals of 90° and the absolute value of the cosine value are alternately equal to the cosine value table, sine value table, cosine value table and sine value table at intervals of 90°. When the number of bits as to angle data is increased, the contents of the sine value table and cosine value table are fractionized with the number of divided equal parts.

These characteristics are summarily shown in FIG.3. The invention utilizes the two characteristics.

Next, the operation of the phase angle data-trigonometric function value converter circuit in the preferred embodiment of the invention will be explained in FIGS.2 to 4.

A sine value data memory 1 and a cosine value data memory 2 in FIG.2 store the sine value data and the cosine value data, respectively, at angles of 0° or more and less than 90° corresponding to the number of bits as to angle data which depends on the number of divided equal parts. Namely, in case of 16 divided equal parts, the number of angle data to be stored are four individually.

Based on the first characteristic, the sine value table and the cosine value table alternate between the sine value and the cosine value depending on the variation of MSB-1 (second bit from MSB).

Accordingly, when the data of MSB-1 is '0', a sine value output selector of the selector 3 outputs the values of the sine value table which are stored in the sine value data memory 1 and a cosine value output selector of the selector 3 outputs the values of the cosine value table which are stored in the cosine value data memory 2. Also, when the data of MSB-1 is '1', a sine value output selector of the selector 3 outputs the values of the cosine value table which are stored in the cosine value data memory 2 and a cosine value output selector of the selector 3 outputs the values of the sine value table which are stored in the sine value data memory 1.

The low-order bits other than the high-order two bits of the angle data are input to the sine value data memory 1 and the cosine value data memory 2 from the input terminal 'IN', and then the corresponding sine value data and cosine value data are output to the sine value output selector and the cosine value output selector of the selector 3 therefrom.

A sign to be added to the absolute values output from the selector 3 is '+' when MSB is '0' and is '−' when MSB is '1' in case of sine value. Therefore, MSB is input to the sign-adding circuit(sine) 5, where the sign is varied depending on the value of MSB. In case of cosine value, the sign is '+' for the first and fourth quadrants and is '−' for the second and third quadrants. Therefore, MSB and MSB-1 are input to the quadrant judgement circuit 4, and then quadrant information is output from the quadrant judgement circuit 4 to the sign-adding circuit(cosine) 6 to vary the sign to be added to the cosine value.

As explained above, in the phase angle data-trigonometric function value converter circuit in the embodiment of the invention, an angle of 360° is divided into n equal parts and n is represented by binary-system angle data. Then, the absolute values of the sine value data and cosine value data at angles from 0° to 90° corresponding to the angle data are individually stored in the memories. Using the remainder bits other than the high-order two bits of the angle data represented by the binary system, the sine value data and cosine value data corresponding to the angle data are output. Further, using the high-order two bits of MSB and MSB-1, the sine value data or the cosine value data is selected and the sign +/− is added. Thus, the composition of the phase angle data-trigonometric function value converter circuit in the embodiment is simplified.

On the other hand, this circuit can be adapted to a composite diversity device with a quadrature phase shift keying(QPSK) manner. Thereby, a composite diversity device with a simpler circuit composition can be realized.

A composite diversity device in a preferred embodiment of the invention will be explained below.

The composite diversity device comprises, to each antenna system, an IF signal limiter which detects a received signal strength as well as amplitude-limiting an intermediate frequency of radio wave received by an antenna, an instantaneous phase detector which conducts the sampling of signals output from the limiter at bit- timing, a phase difference data generator which calculates a phase difference between neighboring two bits, and a polar coordinates/ rectangular coordinates converter which converts a polar coordinates data which is represented by an angle θ of the phase difference data and the received signal strength A to be detected by the IF signal limiter into a rectangular coordinates data represented by (A·cos θ, A·sin θ). In this device, a rectangular coordinates system data to radio wave received by each antenna system is output and then the outputs of antenna systems are composed by a phase vector composer. Then, the output of the composer is converted back into a polar coordinates data by a rectangular coordinates/polar coordinates converter, and decoding thereof is conducted by a data decoder to output a decoded data. Further, a timing reproducer reproduces a bit rate clock and a symbol rate clock synchronizing with the received signal.

In this composite diversity device, the polar coordinates/ rectangular coordinates converter, which converts a polar coordinates data which is represented by an angle θ of the phase difference data and the received signal strength A to be detected by the IF signal limiter into a rectangular coordinates data represented by (A·cos θ, A·sin θ), may comprise the phase angle data-trigonometric function value converter circuit in the above embodiment of the invention. Thereby, the circuit composition of the composite diversity device can be simplified.

Meanwhile, the use of a phase angle data-trigonometric function value converter circuit of the invention is not limited to composite diversity devices.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A phase angle data-trigonometric function value converter circuit for computing a trigonometric function value corresponding to an angle where an angle of 360 degrees is divided into n equal parts, n being an integer, and where angle data represented by a binary number correspond to a respective one of the n equal parts of the angle of 360 degrees, comprising:

a sine value data memory which stores sine values corresponding to said angle data from zero degrees to 90 degrees and outputs sine values corresponding to said angle data inputted to said sine value data memory;

a cosine value data memory which stores cosine values corresponding to said angle data from zero degrees to 90 degrees and outputs cosine values corresponding to said angle data inputted to said cosine value data memory;

a selector to which said sine values output from said sine value data memory and said cosine values output from said cosine value memory are input and which selects said sine values or said cosine values according to said angle data and outputs them; and means for adding a polarity sign to said sine values or cosine values output from said selector according to said angle data.

2. A phase angle data-trigonometric function value converter circuit for computing a trigonometric function value corresponding to an angle, where an angle of 360 degrees is divided into n equal parts, n being an integer, and where angle data represented by a binary number correspond to a respective one of the n equal parts of the angle of 360 degrees comprising:

a sine value data memory which stores sine values corresponding to said angle data from zero degrees to 90 degrees and outputs sine values corresponding to bits other than the two highest order bits of said angle data inputted to said sine value data memory;

a cosine value data memory which stores cosine values corresponding to said angle data from zero degrees to 90 degrees and outputs cosine values corresponding to bits other than the two most significant bits of said angle data inputted to said cosine value data memory;

a selector to which said sine values output from said sine value data memory and said cosine values output from said cosine value memory are input and which selects said sine values or said cosine values according to the second most significant bit of said angle data and outputs them;

a quadrant judgement means which outputs quadrant information according to the two most significant bits of said angle data inputted to said quadrant judgement means; and means for adding a polarity sign to said sine values output from said selector according to the most significant bit of said angle data or adding a polarity sign to said cosine values output from said selector according to said quadrant information output from said quadrant judgement means.

3. A composite diversity receiver, comprising said phase angle data-trigonometric function value converter circuit defined in claim 1.

4. A composite diversity receiver, comprising said phase angle data-trigonometric function value converter circuit defined in claim 2.

* * * * *